United States Patent
Mori et al.

(10) Patent No.: US 7,520,511 B2
(45) Date of Patent: Apr. 21, 2009

(54) O-RING AND CLAMP-TYPE JOINT FOR VACUUM APPARATUS

(75) Inventors: Hideaki Mori, Hamamatsu (JP); Kanji Hanashima, Hamamatsu (JP)

(73) Assignee: Nichias Corporation, Tokyo (JP)

( * ) Notice: Subject to any disclaimer, the term of this patent is extended or adjusted under 35 U.S.C. 154(b) by 183 days.

(21) Appl. No.: 11/473,183

(22) Filed: Jun. 23, 2006

(65) Prior Publication Data

US 2007/0001404 A1 Jan. 4, 2007

(30) Foreign Application Priority Data

Jul. 4, 2005 (JP) .............................. 2005-194702

(51) Int. Cl.
*F16L 17/06* (2006.01)
(52) U.S. Cl. ..................... 277/611; 277/616; 277/626; 277/638; 277/639; 277/641; 277/644; 277/910; 285/379
(58) Field of Classification Search ................ 277/611, 277/638, 639, 641, 910, 616, 626, 644; 285/379
See application file for complete search history.

(56) References Cited

U.S. PATENT DOCUMENTS

| | | | | |
|---|---|---|---|---|
| 3,226,467 A | * | 12/1965 | Kienel et al. ................ 174/18 |
| 3,279,805 A | * | 10/1966 | Quinson ..................... 277/611 |
| 3,355,181 A | * | 11/1967 | Olson ......................... 277/611 |
| 3,531,133 A | * | 9/1970 | Gulick et al. ............... 277/611 |
| 3,584,889 A | * | 6/1971 | Sheets ......................... 277/626 |
| 3,704,021 A | * | 11/1972 | Barbarin et al. ............. 277/611 |
| 3,869,132 A | * | 3/1975 | Taylor et al. ................. 277/608 |
| 3,892,416 A | * | 7/1975 | Ruhe et al. .................. 277/611 |
| 4,095,809 A | * | 6/1978 | Smith ......................... 277/611 |
| 4,345,739 A | * | 8/1982 | Wheatley .................... 251/358 |
| 4,381,869 A | * | 5/1983 | Abbes et al. ................ 277/639 |
| 5,482,297 A | * | 1/1996 | Burns et al. ................. 277/644 |
| 5,518,257 A | * | 5/1996 | Breaker ...................... 277/612 |
| 5,797,603 A | * | 8/1998 | Voirol et al. ................ 277/602 |
| 6,325,390 B1 | * | 12/2001 | Sillmon ...................... 277/614 |
| 6,708,984 B1 | * | 3/2004 | North et al. ................. 277/608 |
| 7,306,237 B2 | * | 12/2007 | Tsuji et al. .................. 277/644 |
| 2006/0087085 A1 | * | 4/2006 | Meller ........................ 277/616 |

OTHER PUBLICATIONS

U.S. Appl. No. 11/473,156, filed Jun. 23, 2006, Hanashima et al.
U.S. Appl. No. 11/473,183, filed Jun. 23, 2006, Mori et al..

* cited by examiner

*Primary Examiner*—Alison K Pickard
(74) *Attorney, Agent, or Firm*—Oblon, Spivak, McClelland, Maier & Neustadt, P.C.

(57) ABSTRACT

An O-ring used in a clamp-type joint for a vacuum apparatus, which engages with a concave groove in the outer circumference edge of the center ring and is sandwiched by an outer ring having a U-shaped outer circumference, wherein the radius of the circular arc in the cross-section on the side coming into contact with the outer ring is smaller than the radius of the circular arc in the cross-section on the axial side of the joint. A clamp-type joint for the vacuum apparatus which can exhibit stable sealing performance at a high temperature of 200° C. or more without cracking of the O-ring, as well as an outer ring and O-ring used with the clamp-type joint are also provided.

5 Claims, 3 Drawing Sheets

O-RING AND CLAMP-TYPE JOINT FOR VACUUM APPARATUS

BACKGROUND OF THE INVENTION

1. Field of the Invention

The present invention relates to an O-ring and a clamp-type joint for a vacuum apparatus using the O-ring, which does not cause cracking of the O-ring during use at a high temperature.

2. Background Art

A typical example of a conventional clamp-type joint for vacuum apparatus specified in JIS B8365 (ISO 2861/1) ("Dimensions and shapes of clamp-type joint for vacuum apparatus", 1988, hereinafter referred to as "JIS standard") is shown in FIG. 2. The clamp-type joint for vacuum apparatus 100 has a coupling 101 having a pair of parallel flat planes 111 and 111, a center ring 102, of which the outer circumference is a concave groove 112, inserted between the pair of flat planes 111 and 111 of the coupling 101, an O-ring 103 engaged with the concave groove 112 of the center ring 102, and a brim 113 of the coupling 101 which is fastened by clamps (not shown) to seal fluids in the planes 111 and 111 of the coupling 101 and the face of the O-ring 103.

A slight internal pressure (positive pressure) may be applied to the clamp-type joint for vacuum apparatus 100, even in the case in which the sealing object is a vacuum pipe. If an internal pressure is applied, the O-ring of the clamp-type joint expands outwardly, thereby inhibiting stable sealing performance and causing a fluid to leak. In the worst case, the O-ring may come off from the clamp-type joint, thereby inhibiting sealing. In order to obviate this problem and to inhibit outward expansion of the O-ring 103 due to internal pressure, an outer ring 105 with a U-shaped cross-section made of metal is provided around the circumference of the O-ring 103 in a manner to cause the O-ring 103 to be engaged therewith, as shown in FIG. 3. A clamp-type joint for vacuum apparatus 200 having this structure can inhibit outward expansion of the O-ring when internal pressure is applied in a pipe of a vacuum apparatus, thereby ensuring stable sealing performance. In addition, since O-rings used for clamp-type joints have improved heat resistance in recent years, the clamp-type joint used in pipes of vacuum apparatuses are used at a high temperature of 200° C. or more in certain occasions.

However, if the clamp-type joint for vacuum apparatus 200 equipped with an outer ring is used at a high temperature of 200° C. or more, the O-ring 103 may crack, resulting in sealing failure in the worst case.

SUMMARY OF THE INVENTION

An object of the present invention is, therefore, to provide a clamp-type joint for vacuum apparatus which can exhibit stable sealing performance at a high temperature of 200° C. or more without cracking of an O-ring and to provide the O-ring used with the clamp-type joint.

In view of this situation, the inventors of the present invention have conducted extensive studies. As a result, the inventors have found that (1) the O-ring cracks at the parts in which a pair of top and bottom brims forming a U-shaped outer ring contacts (X in FIG. 4), (2) analysis using a finite element method (FEM) taking into consideration the coefficient of thermal expansion at a high temperature of 250° C. confirmed, based on the internal stress distribution of the O-ring as shown in FIG. 4, that a maximum large stress of 54 MPa is concentrated in the X parts, (3) due to the greater coefficient of thermal expansion of the rubber used for the O-ring than the coefficient of thermal expansion of metal used for the outer ring by several digits, the O-ring significantly expands outwardly, is pressed against the outer ring, and strongly pushes the brim of the outer ring at high temperatures, creating a large stress concentration, which results in cracking of the O-ring, and therefore, (4) if the diameter of the circular arc of the O-ring in the cross-section on the side coming into contact with a pair of brims of the outer ring is smaller than the diameter of the circular arc of the O-ring in the cross-section on the axial side of the joint, the stress concentration to that part can be reduced and the problem of O-ring cracking can be solved. These findings have led to the completion of the present invention.

Specifically, the present invention provides an O-ring for a clamp-type joint used in a clamp-type joint for vacuum apparatus, which engages with a concave groove in the outer circumference edge of a center ring and is sandwiched by the outer ring having an outer circumference with a U-shaped cross-section, wherein the diameter of the circular arc in the cross-section on the side coming into contact with the outer ring is smaller than the diameter of the circular arc in the cross-section on the axial side of the joint.

The present invention also provides a clamp-type joint for vacuum apparatus comprising the above O-ring incorporated therein.

The clamp-type joint for vacuum apparatus and the O-ring used therein of the present invention do not produce a large stress concentration even if the O-ring significantly expands outwardly and is pressed against the outer ring at a high temperature. Therefore, O-ring cracking which has been a problem in conventional clamp-type joints can be avoided. Firm engagement of the O-ring with the outer ring can be ensured and the outer ring does not come off from the O-ring.

DETAILED DESCRIPTION OF THE INVENTION AND PREFERRED EMBODIMENTS

Figure 1:
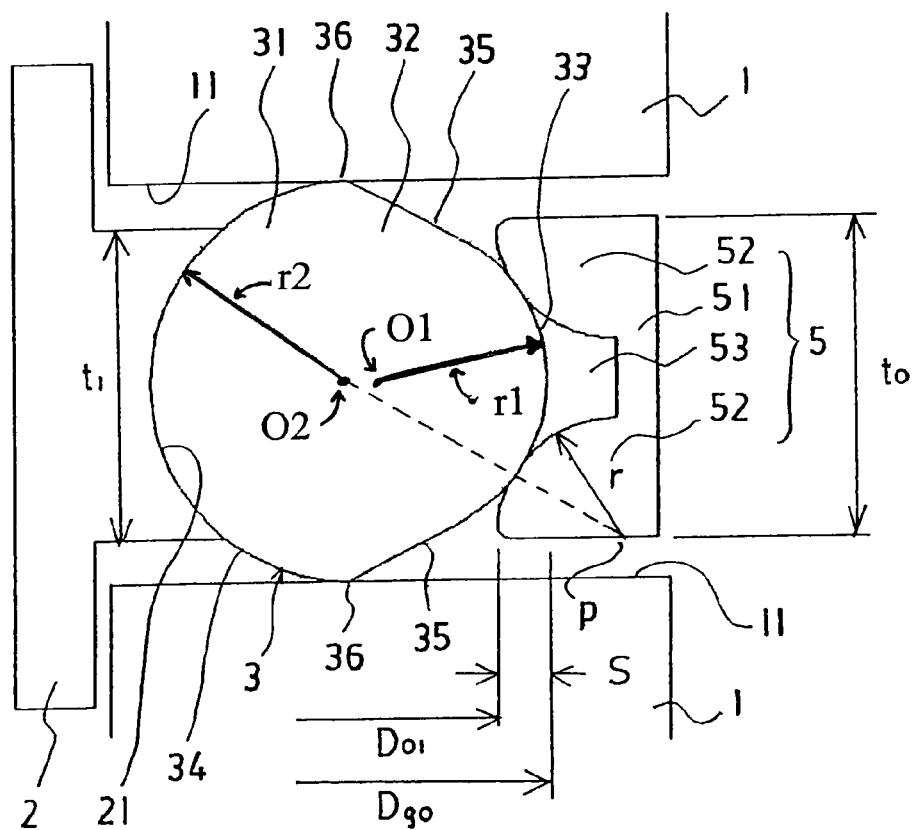
FIG. 1 is a cross-sectional view of a clamp-type joint for vacuum apparatus, shown enlarged in part, according to this embodiment.
Figure 2:
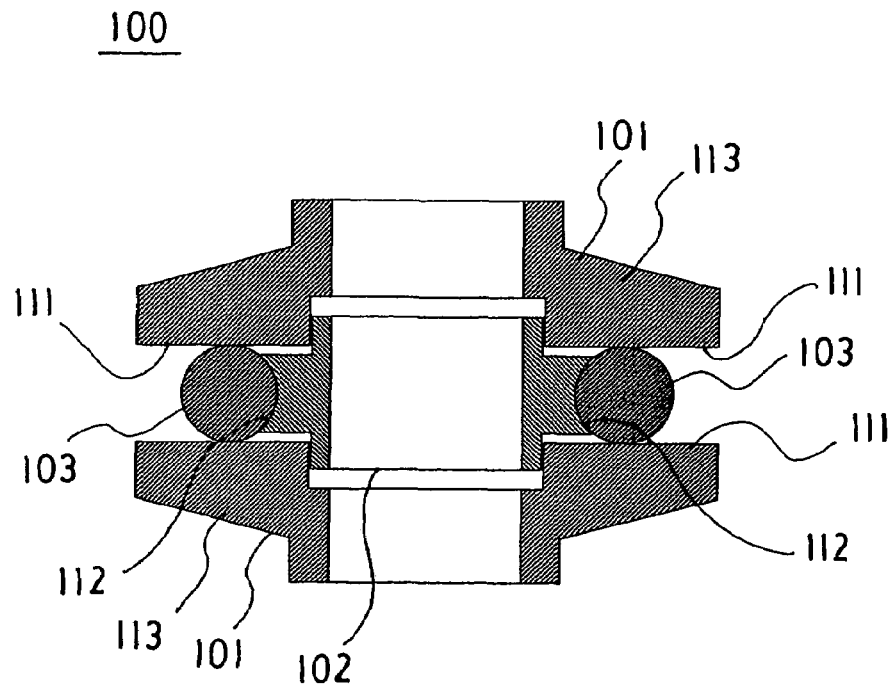
FIG. 2 is a cross-sectional view of a clamp-type joint for vacuum apparatus specified in JIS B 8365 (ISO 2861/1).
Figure 3:
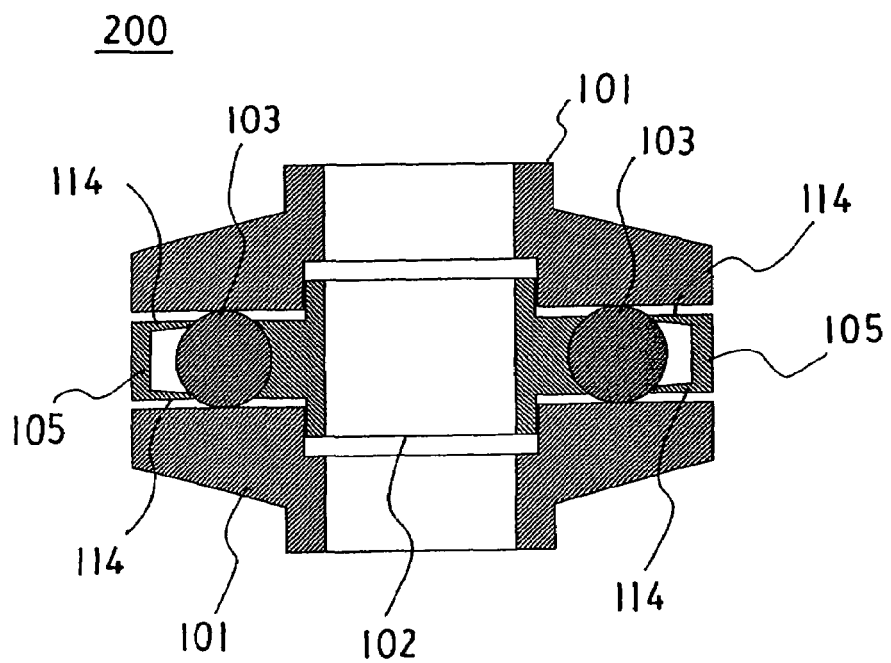
FIG. 3 shows an example of a conventional apparatus, based on the apparatus of FIG. 2, equipped with an outer ring.

The O-ring and the clamp-type joint for vacuum apparatus in the embodiment of the present invention will now be explained with reference to FIG. 1. FIG. 1 is a cross-sectional view of a clamp-type joint for vacuum apparatus, shown enlarged in part, according to this embodiment. In the drawing, the clamps are omitted. In the description, the term "inside" of the clamp-type joint for vacuum apparatus refers to the center axis side of the joint and the term "outside" refers to the side opposing to the inside. When "inside" is used with a brim of the outer ring, the term "inside" refers to the side of the groove existing between a pair of brims.

The clamp-type joint for vacuum apparatus 10 has a coupling 1 having a pair of parallel flat planes 11 and 11, a center ring 2, of which the outer circumference is a concave groove 21, inserted between the pair of flat planes 11 and 11 of the coupling 1, an O-ring 3 engaged with the concave groove 21 of the center ring 2, and an outer ring 5 inserted in the circumference of the O-ring 3 in the manner sandwiching the O-ring 3, the coupling 1 is fastened by clamps (not shown) to seal fluids by the flat planes 11 and 11 of the coupling 1 and the face of the O-ring 3.

The center ring 2 functions to secure the O-ring 3 and makes it easy for axially joining the couplings. Its configuration is specified by the JIS standard, according to which the thickness (shown as $t_1$ in FIG. 1) of the ring portion for forming the concave groove 21 is 3.9 mm.

In the variant O-ring 3 used in this embodiment, the diameter of a circular arc 33 in the cross-section on the side 32 (the right half of variant O-ring 3 in FIG. 1) coming into contact with a pair of brims 52 and 52 of an outer ring 5 is smaller than the diameter of the circular arc 34 in the cross-section on the axial side 31 (the right half of variant O-ring 3 in FIG. 1) of the joint. Specifically, the cross-section on the right half side of the variant O-ring 3 in FIG. 1 has a shape of a projection with a smooth external configuration which is formed from the circular arc 33 and approximately straight lines 35 and 35 connecting the both sides 36 and 36 of the center of the variant O-ring 3 with the circular arc 33. The height (the diameter of the left half circular arc 34) and the width of the variant O-ring 3 are not necessarily the same, but the sizes can be appropriately determined according to use.

In order to ensure stable sealing performance and to inhibit the outer ring 5 from coming off from the O-ring 3, the diameter of the circular arc 33 in the cross-section on the side coming into contact with a pair of brims 52 and 52 of the outer ring 5 is from ⅖ to ⁷⁄₁₀, and preferably from ½ to ⅔ of the diameter of the circular arc 34 in the cross-section on the axial side of the joint. The configuration of the cross-section of the right half side of variant O-ring 3 is not limited to that shown in FIG. 1, but may include a configuration in which the straight line section near the both sides 36 and 36 of the center of variant O-ring 3 is slightly expanded outwardly, for example. The O-ring 3 is made of rubber. Fluororubber or perfluororubber with high heat resistance is preferable for ensuring durability during use at high temperatures of 200° C. or more.

Although not specifically limited, the outer ring 5 used in combination with the O-ring 3 in the present invention is installed in the manner to sandwich the O-ring 3 and has a base 51, of which the cross-section forming the outer circumferential side is rectangular, and a pair of brims 52 and 52, respectively extending from the top and bottom of the base 51 toward the center axis of the joint (the left side of FIG. 1). The inner side of the brims 52 and 52 (the side of groove 53 provided between the pair of brims 52 and 52 in FIG. 1) is preferably in the form of a convex sector, of which the arc faces the O-ring 3.

The pivot of the sector, i.e. the center p of the circle forming the sector, is at the intersection of the line connecting the center of the O-ring 3 and the point on the O-ring 3 at which the O-ring 3 comes into contact with the outer ring 5 and the outermost side of the outer ring 5 in the vertical direction. The radius r of the circular arc forming the sector is 0.3-2.5 mm, preferably 0.6-2 mm, more preferably 1-2 mm, and particularly preferably 1.3-1.7 mm. If the radius r of the circle forming the sector is less than 0.3 mm, the stress concentration generated at high temperatures increases and may cause cracking of the O-ring. If the radius r of the circle forming the sector is greater than 2.5 mm, the difference S between the outer diameter $D_{go}$ of the O-ring 3 and the inner diameter $D_{oi}$ of the outer ring 5 is so small that the outer ring 5 may easily come off from the O-ring 3. The outer ring 5 has a thickness $t_0$ satisfying the formula $t_1 - 0.2 \leq t_0 \leq t_1 + 0.4$, preferably $t_1 \leq t_0 \leq t_1 + 0.2$, and particularly preferably $t_0 = t_1 + 0.1$, wherein $t_1$ is the thickness (mm) of the center ring at the point engaging with the O-ring. If the thickness $t_0$ of the outer ring 5 is less than ($t_1 - 0.2$) mm, a great clearance is produced between the coupling 1 and the outer ring 5, allowing the O-ring 3 to enter the clearance at a high temperature, which may cause the O-ring to crack. If the thickness $t_0$ of the outer ring 5 is greater than ($t_1 + 0.4$) mm, a large clearance is produced between the coupling 1 and the center ring 2, allowing the O-ring 3 to be drawn into the inside and enter the clearance when sealing under vacuum. A stress concentration build up in that portion may cause the O-ring to crack.

As can be appreciated from a review of FIG. 1, the concave groove 21 has a circular arc portion which has a radius r2 about a center O2 which is greater than the radius r1 about a center O2 of the circular arc portion 33 of the O-ring 3 which is in contact with the outer ring 5. The sector shape inside the brims 52 and 52 is not limited to that shown in FIG. 1, but includes, for example, a round shape of which the arc forms a sector in the neighborhood of the point coming into contact with the O-ring 3. For example, the edges of the innermost parts of the brims 52 and 52 in FIG. 1 may be round. Although there are no specific limitations to the material used for the outer ring 5 inasmuch as it is a metallic material, a material having a coefficient of thermal expansion equivalent to or larger than the coefficient of thermal expansion of the material of the center ring 2 is preferable. Among the metallic materials, aluminum alloys are particularly preferable in view of the larger coefficient of thermal expansion.

In the clamp-type joint for vacuum apparatus 10, not only the outer ring 5 does not come off from the O-ring 3, but also a stress concentration caused by thermal deformation due to heat generated during the use at high temperatures of 200° C. or more can be reduced because of contact of the two circular arcs with a large curvature.

The present invention will be described in more detail by examples, which should not be construed as limiting the present invention.

EXAMPLES

Example 1

A clamp-type joint for vacuum apparatus shown in FIG. 1 was prepared. SUS316L (coefficient of thermal expansion: $16.0 \times 10^{-6}/°$ C.) was used as the material for the coupling, center ring, and outer ring. As the material for the O-ring, a heat resistant perfluororubber composition (coefficient of thermal expansion: $2.6 \times 10^{-4}/°$ C.) ("BLAZER-BLACK" manufactured by Nichias Corp.) was used. The nominal diameter 40 (NW40) specified by the JIS standard was applied to the dimensions of the coupling and the center ring. The diameter of the circular arc in the cross-section on the axial side of the joint of the O-ring was 5 mm, the diameter of the circular arc in the cross-section on the side coming in contact with a pair of brims of the outer ring was 3.0 mm, the external diameter of the outer ring was 56 mm, the radius of the arc forming the sector of the brim was 0.5 mm, and the thickness $t_0$ was 3.9 mm. The thickness $t_1$ (mm) of the center ring at the point at which the center ring engages with the O-ring was 3.9 mm. The overlapping width S of the O-ring with the outer ring was 0.5 mm. The following items of the resulting clamp-type joint for vacuum apparatus were evaluated. The results are shown in Table 1.

(Measurement of Maximum Stress and Point at which the Maximum Stress Occurs by FEM Analysis)

The maximum value of the internal stress (maximum stress) of the O-ring and the point at which the maximum stress occurs were determined using a known FEM analysis taking the coefficient of thermal expansion at 250° C. into consideration. In the Table, the case in which the maximum stress occurs on the outer ring side (the right half) was indicated as "Outer" and the case in which the maximum stress occurs on the center ring side (the left half) was indicated as "Center."

(Cracking of O-Ring and the Points at which Cracks Occurred at 250° C.)

A durability test under the conditions of 250° C. was carried out. After 20 hours, the clamp-type joint for vacuum apparatus was disassembled to inspect the presence or absence of cracks of the O-ring and the points at which the cracks occurred. In the Table, the clamp-type joint for vacuum apparatus with no cracks was indicated as "O", whereas the clamp-type joint in which a crack was observed was indicated as "X." In the Table, the case in which a crack was found on the outer ring side (the right half) was indicated as "Outer" and the case in which a crack was found on the center ring side (the left half) was indicated as "Center."

(Ease of Separating Outer Ring from O-Ring)

The conditions of engagement of the outer ring with the O-ring before the durability test were inspected. The tested joint in which the state of engagement was maintained without the outer ring being separated from the O-ring is indicated as "O." The tested joint in which the outer ring was found to be separated from the O-ring at the time of inspection or separated when shaken several times is indicated as "X." The tested joint in which either of the cases "O" and "X" occurred in several tests is indicated by "Δ."

Examples 2 and 3 and Comparative Examples 1 and 2

The same experiments as explained in Example 1 were carried out, except that diameter of the circular arc in the cross-section on the axial side of the joint of the O-ring, the diameter of the circular arc in the cross-section on the side coming in contact with a pair of brims of the outer ring, and the overlapping width s of the O-ring with the outer ring shown in Table 1 were used. The results are shown in Table 1. In the Comparative Example 1, the internal stress distribution of the O-ring was determined using a known FEM analysis taking the coefficient of thermal expansion at 250° C. into consideration. The results are shown in FIG. 4.

TABLE 1

|  | Example | | | Comparative Example | |
| --- | --- | --- | --- | --- | --- |
|  | 1 | 2 | 3 | 1 | 2 |
| Diameter of circular arc in cross-section on axial side of joint of O-ring (mm) | 5.0 | 5.0 | 5.0 | 5.0 | 3.0 |
| Diameter of circular arc in cross-section on outer ring side of O-ring (mm) | 3.0 | 2.0 | 3.5 | 5.0 | 0.0 |
| Maximum stress (250° C.) | 25 | 18 | 30 | 54 | 15 |
| Position of maximum stress | Outer | Outer | Outer | Outer | Outer |
| Actual cracking (250° C.) | O | O | O | X | O |
| Actual position of cracking | — | — | — | Outer | — |
| Overlapping width(mm) | 0.5 | 0.5 | 0.5 | 0.5 | 0.5 |
| Actual ease of outer ring separation | O | Δ | O | O | X |

Figure 4:
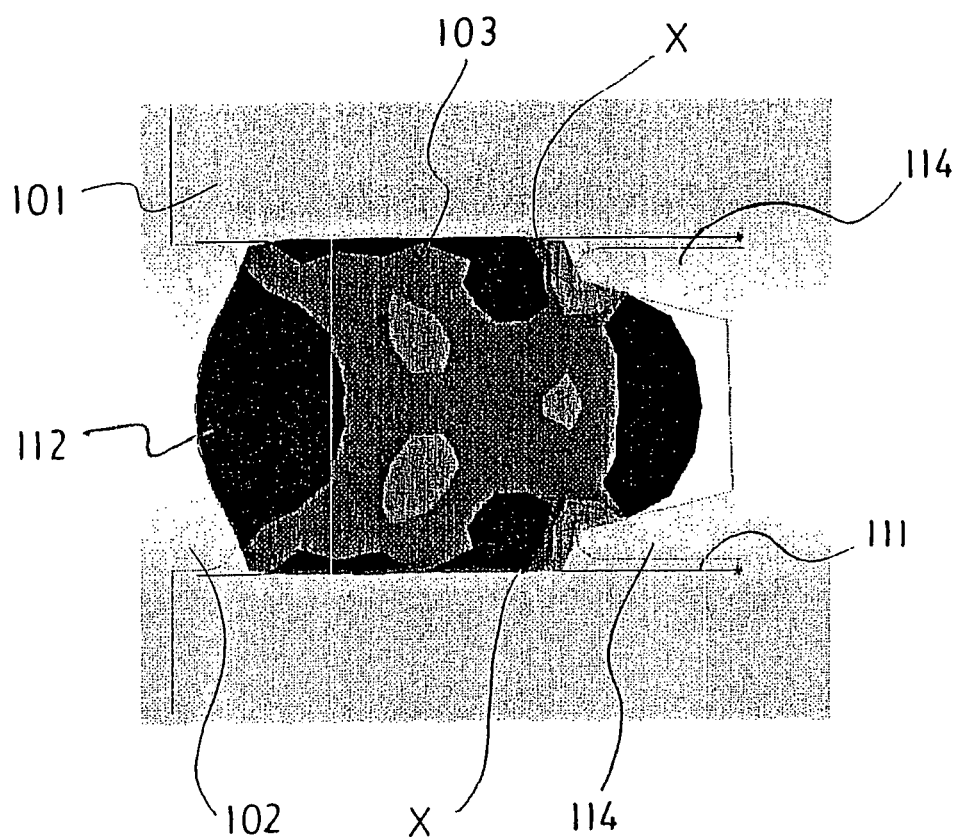
FIG. 4 shows an internal stress distribution of the O-ring of Comparative Example 1, determined using a known FEM analysis taking the coefficient of thermal expansion at 250° C. into consideration.

As can be clearly understood from the results shown in FIG. 4 and Table 1, the FEM analysis of the clamp-type joint for vacuum apparatus of Example 1 confirmed no stress concentration in the O-ring and the maximum stress was no more than 25 MPa. On the other hand, the FEM analysis of the clamp-type joint for vacuum apparatus of Comparative Example 1 confirmed a stress concentration and the maximum stress was 54 MPa which was about twice as large as that of Example 1. Like the clamp-type joint for vacuum apparatus of Example 1, the clamp-type joints of Examples 2 and 3 exhibited no stress concentration and produced no cracks in the O-ring caused by the outer ring. On the other hand, in the case of the O-ring with a circular cross-section (Comparative Example 1), O-ring cracking was not seen under high temperature conditions. In the case of the O-ring with a semicircle cross-section (Comparative Example 2), the outer ring experienced a tendency of coming off from the O-ring. As can be clearly seen in Table 1, the clamp-type joint for vacuum apparatus in which a variant ring is used showed excellent results, i.e. a small maximum stress value, no cracks, and no coming-off of the outer ring.

EXPLANATION OF SYMBOLS

1, 101: coupling
2, 102: center ring
3, 103: O-ring
5, 105: Outer ring
r: radius of circular arc forming sector of outer ring
$t_0$: thickness of outer ring
$t_1$: thickness of concave part of center ring
$D_{oi}$: inner diameter of outer ring
$D_{go}$: outer diameter of O-ring
51: base of outer ring
52: a pair of brims of outer ring

What is claimed is:

1. An O-ring for a clamp-type joint used in a clamp-type joint for a vacuum apparatus, said joint including a center ring having a concave groove formed therein and an outer ring between which said O-ring is positioned, said O-ring engaging said concave groove at an outer circumference edge of said center ring, wherein the O-ring has a circular arc portion located on a side thereof in contact with the outer ring and wherein, in an unclamped state, the concave groove of said center ring has a circular arc portion which has a radius which is greater than that of said circular arc portion in contact with the outer ring, wherein the outer ring comprises a base forming an outer circumferential side and a pair of brims respectively extending from a top and bottom of the base toward the center axis of the joint, an inner side of the brims comes into contact with the O-ring which is in the form of a convex sector, wherein the radius of the circular arc forms a sector which is in a range of 0.3-2.5 mm, and wherein a thickness ($t_0$) of the outer ring satisfies the formula;

$$t_1 - 0.2 \leq t_0 \leq t_1 + 0.4,$$

wherein $t_1$ is the thickness (mm) of the center ring at a point engaging with the O-ring.

2. A clamp-type joint for vacuum apparatus comprising the O-ring of claim 1 incorporated therein.

3. The clamp-type joint according to claim 2, wherein said O-ring comprises a material configured to withstand temperature conditions of 200° C. or more.

4. The O-ring according to claim 1, wherein said O-ring has at least one substantially straight side in the unclamped state.

5. The O-ring according to claim 4, wherein said at least one side comprises a pair of sides.

* * * * *